Figure 1:
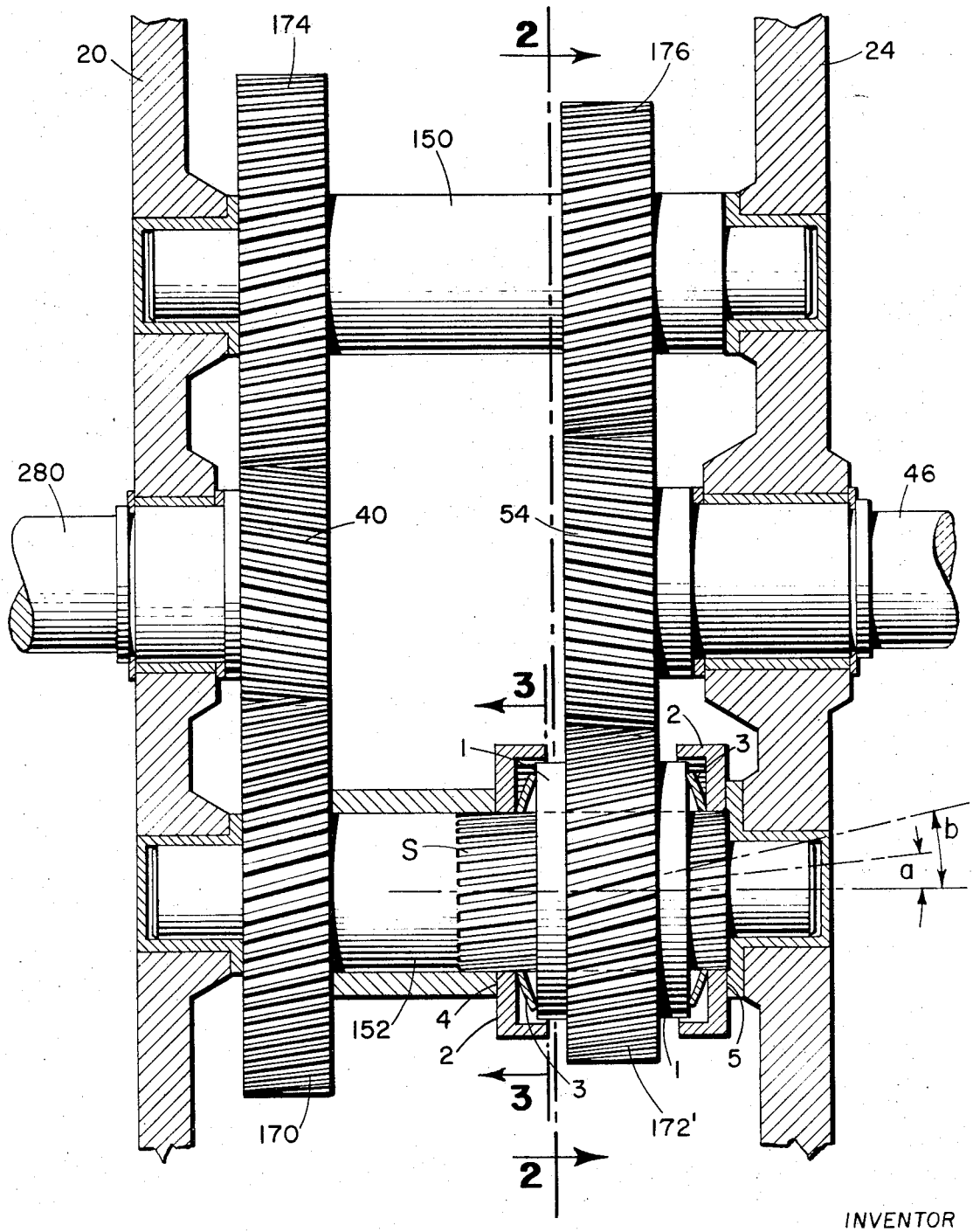

United States Patent [19]
Warren

[11] 3,772,934
[45] Nov. 20, 1973

[54] FLOATING HELICAL GEAR
[75] Inventor: Robert C. Warren, Carbondale, Pa.
[73] Assignee: Robert C. Warren, Carbondale, Pa. and John C. Baumann, Childs, Pa.
[22] Filed: Nov. 15, 1971
[21] Appl. No.: 198,746

[52] U.S. Cl. .............................................. 74/410
[51] Int. Cl. ........................................ F16h 57/00
[58] Field of Search .................. 74/665 P, 410, 409

[56] References Cited
UNITED STATES PATENTS
3,563,105  2/1971  Graziosi ............................. 74/410

Primary Examiner—Leonard H. Gerin
Attorney—Richard K. Stevens et al.

[57] ABSTRACT

A helical gear is floatably mounted on a shaft by virtue of the gear having an internal helical spline engaging an external corresponding spline on the shaft whose helix angle differs from that of the gear teeth so that axial displacement of the gear along the spline will cause the gear to rotate to an extent that the gear teeth alignment relative to a matching gear changes. The invention is applicable to any gear type arrangement involving multiple countershafts.

10 Claims, 3 Drawing Figures

INVENTOR
Robert C. Warren

BY Stevens, Davis, Miller & Mosher
ATTORNEYS

FLOATING HELICAL GEAR

The purpose of this invention is to compensate for misalignment, such as may result from improper machining, which may exist betwen intermeshing helical gears. It is no problem to properly intermesh two helical gears whose respective shafts are rotatable relative to each other. A problem, however, does arise when the two gears must be intermeshed while their respective shafts are for some reason rotatably fixed relative to each other. This situation occurs, for example, in gear type drive transmissions of the multiple countershaft type such as those disclosed in U.S. Pat. Nos. 3,105,395 (Perkins) and 3,255,644 (Warren et al.). In such transmissions, one countershaft acts as a rotatable lock for the other. In other words, once all the matching gears are intermeshed, there is a fixed rotative relationship established between the respective shafts. If then, any misalignment between teeth of matching gears exists at any point, since the shafts are rotatably interlocked, there is no possibility of their compensating for such misalignment and excesssive stresses occur on the mechanism.

According to this invention, therefore, at least one of the four fixed gears on the countershafts, is rotatable to a limited extent in order to compensate for such misalignment. This expedient facilitates the initial assembly of the transmission and also serves to automatically maintain a proper meshing of the countershaft gears with the main shaft gears at all times during running conditions so as to realize a uniform torque distribution.

Said Perkins patent in fact is directed to the problem of uneven distribution of torque in multi-countershaft transmissions, as is stated in column 1, line 68 to column 2, line 22 in said Perkins patent. The Perkins patent proposes as a solution, the provision of a floating main shaft. This solution, however, suffers from the disadvantage that vibrations may occur in such floating shaft with consequent damage and increased wearing out of the respective parts of the assembly.

The present invention, therefore, proposes to solve the problem through another means, namely: that of securely (non-floatably) mounting the main shaft and the therewith cooperating plurality of countershafts while floatably mounting only selected ones of the respective helical gears mounted on said shafts.

An object of the present invention, therefore, is the provision of an expedient to compensate for misalignment of helical gear teeth in multiple countershaft type gear arrangements.

A further object of the invention is the provision of a helical gear which may rotate to a limited extent about its shaft to compensate for tooth misalignment of that gear relative to a matching gear.

Another object of the invention is the realization of a simple and reliable arrangement whereby a helical gear may automatically and during running conditions adjust itself on its shaft in order to compensate for tooth misalignment relative to a matching gear.

Figure 2:
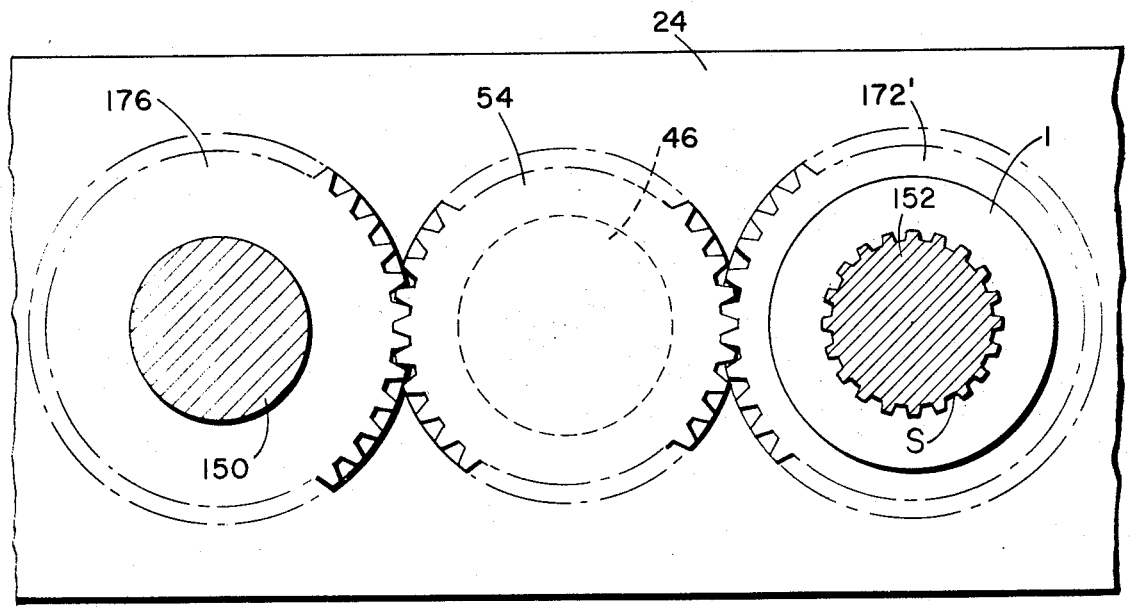
Figure 3:
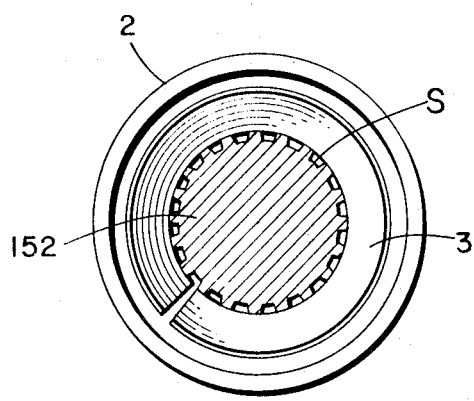

Other objects are those which are inherent in the invention as disclosed and illustrated herein with reference to the accompanying drawings, wherein:

FIG. 1 is a plan view of a typical gearing arrangement to which the present invention is applicable; and FIGS. 2 and 3 are views taken respectively along lines 2—2 and 3—3 of FIG. 1.

The typical gearing arrangement which is shown in the drawings is one which could be used in a variety of gear type transmissions, and especially a motor vehicle transmission such as that of U.S. Pat. No. 3,255,644. In fact, the arrangement of FIG. 1 herein is intended to specifically coincide with the left hand portion of FIG. 2 of U.S. Pat. No. 3,255,644 and, therefore, the same reference numbers will be used in this application as those shown in said patent to designate corresponding parts.

The transmission assembly comprises housing end walls 20 and 24 which rotatably support the main shaft means respective coaxially aligned shafts 28 and 46 and the two countershafts 150 and 152 which are on diametrically opposite sides of the main shaft means.

Helical gear 40 is integral with input drive shaft 28 which is connected to the not shown engine, while helical gear 54 is integral with second main shaft 46. The helical gears 174 and 176 are each integral with countershaft 150 as helical gear 170 is with shaft 152. Helical gear 172' normally would be integral with shaft 152 as its counterpart 172 is in FIG. 2 of U.S. Pat. No. 3,255,644 but in the present case said gear 172' is floatably mounted on shaft 152 as is to be described.

In comformity with the operation of the assembly in U.S. Pat. No. 3,255,644, gear 40 drives the two countershafts 150 and 152 through the gears 174 and 170, said countershafts in turn driving the second main shaft 46 by virtue of the meshing of gears 176 and 172' with gear 54. Said shaft 46 in turn transmits driving torque to the remainder of the transmission assembly which is not shown in this application but which will preferably coincide with that shown in FIG. 2 of U.S. Pat. No. 3,255,644. Also, a known clutching arrangement such as elements 60,68 of U.S. Pat. No. 3,255,644 may be located between gears 40 and 54 to provide a direct drive from shaft 28 to shaft 46. In such a case, gear 54 would be freely rotatably mounted on shaft 46 instead of integrally as shown herein. Whether gear 54 is integral with/or freely rotatable relative to shaft 46 makes no difference, however, as to the applicability and operation of the present invention.

According to the present invention, the gear 172' is mounted on shaft 152 by a spline means S which is itself helical. The helix angle $a$ of the spline means, however, is different from the helix angle $b$ of the gear teeth so that any axial movement of gear 172' along shaft 152 will not only result in rotation of gear 172' relative to said shaft 152 but also will result in rotation of said gear 172' relative to gear 54 whereby the respective gear teeth change their orientation relative to each other. In other words, if the helix angles $a$ and $b$ were the same, the gear 172' would be able to move axially along shaft 152 but without even rotating relative to gear 54 and without, therefore, being able to compensate for misalignment between the teeth of gear 54 and those of gear 172'. It is essential, therefore, that the helix angle $a$ and $b$ differ from each other.

It is evident that what causes the floatable gear to slide along the splined shaft (and therefore rotate relative thereto) are the stresses arising from improper meshing of the helical cut teeth on the matching gears. In other words, such improper meshing itself creates stresses which tend to displace the gears eliminate the improper meshing. The floatable gear, therefore, moves in accordance with such stresses to a position of proper tooth meshing. The action is automatic.

FIG. 1 shows a specific arrangement for floatably mounting gear 172' on shaft 152.

Gear 172' includes an axially extending collar 1 on each face thereof extending into a cavity or hollow portion of a spring retaining cup washer 2, each said washer 2 being freely mounted on shaft 152 on opposite sides of gear 172'. A dish shaped flat spring 3, also freely mounted about shaft 152, is housed within each washer 2. The washers 2 abut against suitable shoulder means 4, 5, so that they are prevented from sliding axially away from the gear 172'.

Gear 172' is normally centrally aligned relative to gear 54 and may move axially in either direction, usually this being in the order of 0.040 inches. The difference between angles $a$ and $b$ should be sufficient to permit gear 172' to rotate a few degrees relative to gear 54. In any event, the degree of rotation should be less than the pitch between two successive gear teeth.

The floatability of gear 172' permits it to move relative to gear 54 whenever the respective teeth of these two gears are in misalignment. This applies also to any misalignment which originates at any other of the pairs of meshing gears. For example, assume that misalignment actually occurs between the teeth of gears 174 and 40. Since these two gears are fixed on their respective shafts, said gears cannot move relative to the shafts, however, shaft 150 could rotate relative to shaft 28 in order to compensate for the misalignment, but this in turn would rotate gear 176 into a position of misalignment with gear 54. Instead, however, gear 54 and shaft 46 rotate to compensate for the misalignment occurring between gears 176 and 54. This turning of shaft 46 however transfers the misalignment to between gears 54 and 172' which, however, is automatically compensated for by the floatability of gear 172'.

The point, therefore, is that regardless of whether misalignement occurs between gears 40 and 174 or 40 and 170 or 176 and 54, it will be transmitted throughout the gear system and the floatability of a single gear, such as 172', will serve to compensate for this misalignment. The misalignment may manifest itself during the initial assembly of the transmission in which case the floatability of gear 172' facilitates the initial assembly of the gears with all gears properly intermeshing. On the other hand, the misalignment could manifest itself repetitively during operation of the transmission because of improperly cut teeth and in this case the compensation therefor would occur repetitively and automatically during such operation.

The floatable gear need not be the one illustrated but could also be either of gears 170, 174 or 176.

It should be noted that the floatable gear according to this invention would not be critical to a single countershaft arrangement, such as one which excludes shaft 152. In such a case any misalignment between, for example, gears 40 and 174 would simply be transmitted to shaft 46 through gear 176 which would be fixed on its shaft, and the compensation for this misalignement could be compensated for by subsequent not shown gears mounted on shaft 46.

The present invention, therefore, is especially applicable to a situation in which successive gear shafts cannot rotate relative to each other, excepting according to a fixed preestablished rotative relationship. That is, if gear 172' were fixed on shaft 152, it would mean that shafts 28, 150, 152 and 46 would all be locked into each other according to a fixed rotative relationship. Stated otherwise, shaft 46 would be rotatively locked relative to shaft 28 by each of two separate locking means, namely shafts 150 and 152. In such a context, the present invention is highly useful and specifically either of the shown countershaft gears should be floatable. On the other hand, if shaft 150 and its gears 174 and 176 were not present, shaft 46 would be free to rotate relative to shaft 152 to compensate for teeth misalignment between either gears 40 and 170 or gears 54 and 172'. In such a context, the present invention would not be as critical.

It is clear that it makes no difference the applicability of the present invention, whether gear 54 is integral with shaft 46 or is freely rotatable thereon but connectable thereto by a known clutching means such as 60, 68 of U.S. Pat. No. 3,255,644.

As aforementioned, this invention has been specifically illustrated with reference to the auxiliary transmission assembly (the left hand portion) of FIG. 2 of U.S. Pat. No. 3,255,644. It, however, also applies to the right hand portion of FIG. 2 of U.S. Pat. No. 3,255,644 and specifically to gears 208, 210 (or their counterparts 190, 192) and reversing gear 109.

The disclosure of U.S. Pat. No. 3,255,644 is incorporated hereinto by reference insofar as it may be necessary to an understanding of this invention.

What is claimed is:

1. A gear type power drive transmission comprising a first and second drive shaft and a pair of parallel countershafts arranged to transmit torque from said first to said second drive shaft, a first helical gear on each of said countershafts meshing with a gear on said second drive shaft, at least one of the aforementioned countershaft gears being floatably mounted on its corresponding shaft so as to be able to rotate relative thereto in either rotative sense to an extent less than the distance between successive ones of the gear teeth of said one gear.

2. The transmission of claim 1, saif floatably mounted gear being mounted on its countershaft by a helical spline means.

3. The transmission of claim 2, said floatably mounted gear being axially displaceable along said spline means to a limited extent in either axial direction from a normal position of radial alignment of said floatably mounted gear relative to its corresponding main shaft gear.

4. The transmission of claim 3, said limited extent being 0.040 inch.

5. The transmission of claim 1, wherein said first drive shaft is adapted to be drivingly connected to a vehicle engine and said second drive shaft is arranged to transmit driving torque to the vehicle wheels.

6. A gear type power drive transmission comprising a first and second drive shaft and a pair of parallel countershafts arranged to transmit torque from said first to said second drive shaft, a first helical gear on each of said countershafts meshing with a gear on said second drive shaft, at least one of the aforementioned countershaft gears being floatably mounted on its corresponding shaft by a helical spline means having a helix angle different from that of the gear teeth so as to be able to rotate relative thereto in either rotative sense to an extent less than the distance between successive ones of the gear teeth of said one gear.

7. A gear type power drive transmission comprising a first and second drive shaft, a pair of parallel countershafts arranged to transmit torque from said first to said second drive shaft, a first helical gear on each of said countershafts meshing with a gear on said second drive shaft, at least one of the aforementioned countershaft gears being floatably mounted on its corresponding shaft by a helical spline means so as to be able to rotate relative thereto in either rotative sense to an extent less than the distance between successive ones of the gear teeth of said one gear and a resilient biasing means urging said floatably mounted gear to a particular axial position along the extent of said spline means, said floatably mounted gear being displaceable to a limited extent in either direction away from said position.

8. The transmission of claim 7, said biasing means comprising a spring means acting against each opposite face of said floatably mounted gear.

9. A helical gear mounted on a shaft so as to be able to rotate relative thereto an extent less than the distance between successive teeth on said gear, said gear including an internal helical spline engaging a matching external spline on said shaft, the helix angle of said spline being different from that of the gear teeth, said gear being axially slidable along said spline to an extent corresponding to a degree of rotation of said gear relative to said shaft which is less than the pitch between successive gear teeth.

10. The gear of claim 9, including spring biasing means urging said gear to a neutral position along said spline, said gear being slidable in either axial direction along said spline against the urging of said spring means and correspondingly rotatable in either rotative sense relative to said shaft to said extent.

* * * * *